(12) United States Patent
Kim (10) Patent No.: US 11,258,336 B2
(45) Date of Patent: Feb. 22, 2022

(54) SENSING DEVICE HAVING A STATOR HAVING A STATOR RING WITH PROTRUSIONS TO BE SECURED TO A STATOR HOLDER

(71) Applicant: LG INNOTEK CO., LTD., Seoul (KR)

(72) Inventor: Sung Min Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 118 days.

(21) Appl. No.: 16/495,444

(22) PCT Filed: Apr. 25, 2018

(86) PCT No.: PCT/KR2018/004769
§ 371 (c)(1),
(2) Date: Sep. 19, 2019

(87) PCT Pub. No.: WO2018/199606
PCT Pub. Date: Nov. 1, 2018

(65) Prior Publication Data
US 2020/0059138 A1 Feb. 20, 2020

(30) Foreign Application Priority Data
Apr. 25, 2017 (KR) .......................... 10-2017-0052956

(51) Int. Cl.
*H02K 11/24* (2016.01)
*H02K 1/18* (2006.01)
(Continued)

(52) U.S. Cl.
CPC ............. *H02K 11/24* (2016.01); *H02K 1/185* (2013.01); *B62D 5/04* (2013.01); *H02K 1/18* (2013.01);
(Continued)

(58) Field of Classification Search
CPC .......... H02K 1/18; H02K 1/182; H02K 1/185; H02K 1/187; H02K 11/20; H02K 11/21;
(Continued)

(56) References Cited

U.S. PATENT DOCUMENTS 8,939,038 B2 * 1/2015 Woo ........................ G01L 3/104
73/862.335
9,434,410 B2 * 9/2016 Lee ....................... B62D 5/0457
(Continued)

FOREIGN PATENT DOCUMENTS

JP 2013-524207 6/2013
JP 2014-204521 10/2014
(Continued)

OTHER PUBLICATIONS

International Search Report dated Jul. 24, 2018 issued in Application No. PCT/KR2018/004769.
(Continued)

*Primary Examiner* — Tulsidas C Patel
*Assistant Examiner* — Rashad H Johnson
(74) *Attorney, Agent, or Firm* — Ked & Associates, LLP (57) ABSTRACT

An embodiment relates to a sensing device comprising: a rotor; and a stator arranged on the outer side of the rotor, wherein the stator comprises a stator holder and a stator ring arranged on the stator holder; the stator ring comprises a body, a plurality of teeth formed to protrude from the inner peripheral surface of the body, and a protrusion part formed to protrude from the outer peripheral surface of the body; and, when seen in the radial direction, the protrusion part is arranged between the teeth and comprises at least two protrusions arranged to be spaced from each other. Accordingly, the coupling force between the stator holder and the stator ring can be improved.

14 Claims, 6 Drawing Sheets

(51) Int. Cl.
*B62D 5/04* (2006.01)
*H02K 11/25* (2016.01)
*H02K 11/20* (2016.01)
*H02K 11/21* (2016.01)

(52) U.S. Cl.
CPC .............. *H02K 1/187* (2013.01); *H02K 11/20* (2016.01); *H02K 11/21* (2016.01); *H02K 11/25* (2016.01); *H02K 2201/09* (2013.01)

(58) Field of Classification Search
CPC ........ H02K 11/24; H02K 11/25; H02K 11/30; H02K 15/022; H02K 2201/09; B62D 5/04; B62D 5/0457
USPC .............................. 310/68 B, 71, 257; 74/492
See application file for complete search history.

(56) References Cited

U.S. PATENT DOCUMENTS

| | | | | |
|---|---|---|---|---|
| 9,702,776 | B2* | 7/2017 | Schoepe | G01L 3/104 |
| 10,267,692 | B2* | 4/2019 | Son | G01L 3/101 |
| 10,814,909 | B2* | 10/2020 | Yang | G01D 5/12 |
| 10,871,411 | B2* | 12/2020 | Rachui | G01L 5/221 |
| 2011/0167928 | A1* | 7/2011 | Maehara | B62D 6/10 |
| | | | | 73/862.325 |
| 2012/0062216 | A1* | 3/2012 | Kang | G01D 5/145 |
| | | | | 324/207.2 |
| 2012/0260746 | A1* | 10/2012 | Lee | G01L 3/104 |
| | | | | 73/862.332 |
| 2012/0297916 | A1* | 11/2012 | Lee | B62D 5/0457 |
| | | | | 74/492 |
| 2016/0238471 | A1* | 8/2016 | Son | G01L 3/104 |
| 2016/0325781 | A1* | 11/2016 | Choi | B62D 15/0215 |
| 2017/0052077 | A1* | 2/2017 | Lee | B62D 6/10 |
| 2017/0254710 | A1* | 9/2017 | Lee | B62D 15/021 |
| 2017/0254711 | A1* | 9/2017 | Park | B62D 15/021 |
| 2017/0350776 | A1* | 12/2017 | Woo | B62D 15/021 |
| 2019/0135338 | A1* | 5/2019 | Won | G01L 3/104 |
| 2019/0277658 | A1* | 9/2019 | Son | G01D 11/24 |
| 2019/0301954 | A1* | 10/2019 | Lee | G01L 5/221 |
| 2019/0344826 | A1* | 11/2019 | Yang | B62D 6/10 |
| 2020/0059138 | A1* | 2/2020 | Kim | H02K 1/14 |
| 2020/0136447 | A1* | 4/2020 | Lee | H02K 1/278 |
| 2021/0080288 | A1* | 3/2021 | Lee | G01D 5/14 |
| 2021/0086828 | A1* | 3/2021 | Lee | B62D 6/10 |

FOREIGN PATENT DOCUMENTS

| | | |
|---|---|---|
| JP | 2015-019507 | 1/2015 |
| KR | 10-2015-0000944 | 1/2015 |
| KR | 10-2015-0030040 | 3/2015 |
| KR | 10-2015-0042379 | 4/2015 |
| KR | 10-2016-0137926 | 12/2016 |

OTHER PUBLICATIONS

European Search Report dated Dec. 9, 2020 issued in Application No. 18790391.9.
Korean Office Action dated Jun. 3, 2021 issued in KR Application No. 10-2017-0052956.

* cited by examiner

SENSING DEVICE HAVING A STATOR HAVING A STATOR RING WITH PROTRUSIONS TO BE SECURED TO A STATOR HOLDER

CROSS-REFERENCE TO RELATED PATENT APPLICATIONS

This application is a U.S. National Stage Application under 35 U.S.C. § 371 of PCT Application No. PCT/KR2018/004769, filed Apr. 25, 2018, which claims priority to Korean Patent Application No. 10-2017-0052956, filed Apr. 25, 2017, whose entire disclosures are hereby incorporated by reference.

TECHNICAL FIELD

The present invention relates to a sensing device.

BACKGROUND ART

Electronic Power Steering Systems (hereinafter, referred to as 'EPS') allow an electronic control unit (ECU) to drive a motor according to driving conditions to secure turning stability and provide quick resilience so as to allow a driver to safely drive a vehicle.

To provide appropriate torque, an EPS includes a torque sensor that measures torque of a steering shaft. The steering shaft may include an input shaft connected with a steering wheel and an output shaft connected with power transfer components of wheels.

The torque sensor measures a degree of distortion between the input shaft and the output shaft to measure torque being applied to the steering shaft. The torque sensor may include a housing, a rotor, a stator, and a sensor part.

In this case, the stator may include a stator ring and a stator holder to which the stator ring is fixed.

According to the rotation of the steering wheel, the stator holder connected with the output shaft is also rotated.

Further, as a rotating force is continuously applied to the stator holder, a gap between the stator ring and the stator holder, which are coupled, increases. Therefore, a problem occurs in that the stator ring moves in a circumferential direction.

Particularly, since an R-type EPS is installed in an engine room, the R-type EPS requires a higher mechanical condition than a C-type EPS. For example, the C-type EPS requires a temperature condition of 40 to 85° C., but the R-type EPS requires a temperature condition of −40 to 125° C.

Therefore, to satisfy enhanced reliability requirements, a coupling force between the stator holder and the stator ring is increased, and thus an increase in gap due to a continuous rotating force can be prevented.

DISCLOSURE

Technical Problem

The present invention is directed to providing a sensing device which increases a coupling force between a stator holder and a stator ring to prevent a gap between the stator holder and the stator ring due to a rotation of the stator holder.

Particularly, the present invention is directed to providing a sensing device which increases a caulking force in a rotation direction using at least two protrusions formed in the stator ring.

The problem to be solved by the present invention is not limited to the above-described problem, and other objects that are not mentioned will be clearly understood by those skilled in the art from the following descriptions.

Technical Solution

One aspect of the present invention provides a sensing device which includes a rotor and a stator disposed on an outside of the rotor, wherein the stator includes a stator holder and a stator ring disposed in the stator holder, the stator ring includes a body, a plurality of teeth formed to protrude from an inner circumferential surface of the body, and a protrusion part formed to protrude from an outer circumferential surface of the body, and the protrusion part is disposed between the teeth when viewed in a radial direction and is provided as two or more protrusions disposed to be spaced apart from each other.

The stator holder may include a stator ring-fixing part and a shaft-fixing part, and the protrusions may be coupled to an outer surface of the stator ring-fixing part in a caulking manner.

The stator ring-fixing part may be formed of a synthetic resin.

The stator holder may include a stator ring-fixing part and a shaft-fixing part, the stator ring-fixing part may include a fixing part-main body and a flange that protrudes from an outer circumferential surface of the fixing part-main body in the radial direction, and the protrusions may be fixed to the flange in a caulking manner.

Grooves may be formed in the flange by the caulking, and the protrusions may be supported by holding-protrusion surfaces formed in the grooves.

The stator holder may include a stator ring-fixing part and a shaft-fixing part, wherein the stator ring-fixing part may include the fixing part-main body and the flange that protrudes from an outer circumferential surface of the fixing part-main body in the radial direction, and the protrusions may be bent and disposed in the grooves of the flange.

A ratio of a distance (d) between the protrusions to a width (W) of the protrusion may be 1:1.5.

One surface of the protrusion may be formed to be inclined from a virtual line (L), which passes through a center of the protrusion, at a predetermined angle (θ).

A width of the protrusion may increase in a direction away from the body.

The protrusion may be formed in a trapezoid form.

The body, the teeth, and the protrusions may be integrally formed, and the teeth and the protrusions may protrude in the same direction.

A height of the protrusion may be smaller than that of the tooth.

The sensing device may further include a sensing unit configured to measure a magnetic field generated between the rotor and a stator assembly.

Advantageous Effects

A sensing device according to embodiments can increase a coupling force between a stator holder and a stator ring using a protrusion part that includes two or more protrusions spaced apart from each other.

In this case, contact areas and a coupling force in a rotation direction between the protrusions and the stator holder is increased using a caulking method, and thus movement of the stator ring due to a rotation of the stator holder can be prevented or minimized.

That is, when a caulking force between the stator ring and the stator holder is increased, the protrusions of the stator ring are fixed to the stator holder, and thus movement of the stator ring due to the rotation of the stator holder can be prevented.

Various and advantageous advantages and effects of the embodiments are not limited to the above descriptions and will be more easily understood in a process of describing specific embodiments of the present invention.

MODES OF THE INVENTION

While the invention is susceptible to various modifications and alternative forms, specific embodiments thereof will be shown by way of example in the accompanying drawings and described in detail therein. However, it should be understood that there is no intent to limit the invention to the particular forms, but on the contrary, the invention is to cover all modifications, equivalents, and alternatives included within the spirit and scope of the invention.

Although the terms "second," "first," etc. may be used herein to describe various elements, it should be understood that these elements are not limited by the terms. The terms are only used to distinguish one element from another. For example, without departing from the scope of the present invention, a second element could be termed a first element, and, similarly, a first element could be termed a second element. As used herein, the term "and/or" includes any combination or one of a plurality of associated listed items.

It should be understood that when an element is referred to as being "connected" or "coupled" to another element, the element can be directly connected or coupled to another element, or intervening elements may be present. In contrast, when an element is referred to as being "directly connected" or "directly coupled" to another element, there are no intervening elements present.

In descriptions of the embodiment, when one component is referred to as being formed "on or under" another component, two components may be in direct contact with each other or at least one still another component may be indirectly formed between the two components. Further, the term "on or under" may refer to not only an upward direction but also a downward direction based on one component.

The terms used herein are for the purpose of describing particular embodiments only and are not intended to limit the invention. As used herein, the singular forms are intended to include the plural forms as well, unless the context clearly indicates otherwise. In this specification, it should be understood that the terms "comprise," "comprising," "include," and/or "including" specify the presence of stated features, integers, steps, operations, elements, components, and/or combinations thereof but do not preclude the presence or addition of one or more other features, integers, steps, operations, elements, components, and/or combinations thereof Unless otherwise defined, all terms including technical and scientific terms and used herein have the same meaning as commonly understood by one of ordinary skills in the art to which this invention belongs. It should be understood that terms, such as those defined in commonly used dictionaries, should be interpreted as having a meaning that is consistent with their meaning in the context of the relevant art and are not to be interpreted in an idealized or overly formal sense unless expressly so defined herein.

Hereinafter, embodiments of the present invention will be described in detail with reference to the accompanying drawings, but the same or similar elements are designated with the same numeral references regardless of numerals, and redundant descriptions thereof will be omitted.

Figure 1:
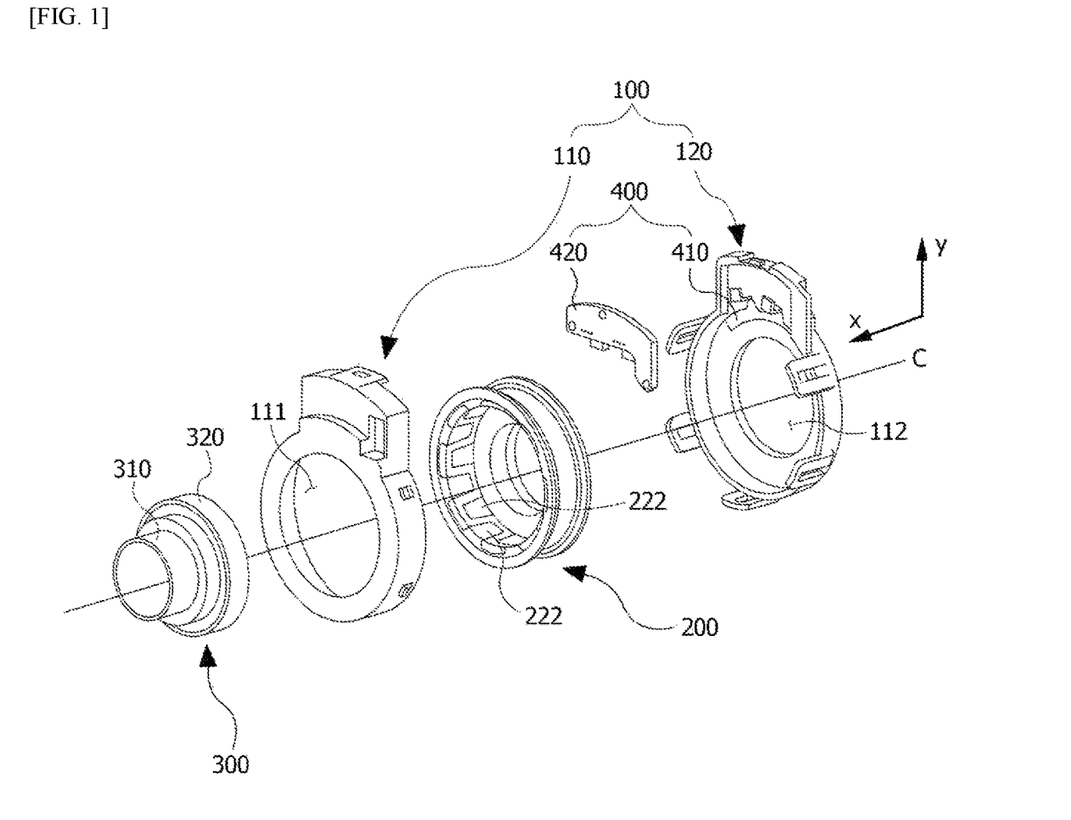
FIG. 1 is an exploded perspective view illustrating a sensing device according to one embodiment of the present invention.

FIG. 1 is an exploded perspective view illustrating a sensing device according to one embodiment of the present invention. In this case, an x-direction shown in FIG. 1 represents an axial direction, and a y-direction represents a radial direction. Further, the axial direction is perpendicular to the radial direction.

Referring to FIG. 1, a sensing device 1 according to one embodiment of the present invention may include a housing 100, a stator 200, a rotor 300, and a sensing unit 400. In this case, the stator 200 may be referred to as a stator assembly.

The housing 100 may form an exterior of the sensing device 1.

The housing 100 may include a first housing 110 and a second housing 120 that are coupled to each other so that an accommodation space is formed therein.

The first housing 110 may include a first through hole 111 through which an input shaft (not shown) passes, and the second housing 120 may include a second through hole 121 through which an output shaft (not shown) passes. In this case, the input shaft may be connected with a steering wheel, and the output shaft may be connected to wheels. In this case, the first through hole 111 may be referred to as a first housing hole, and the second through hole 121 may be referred to as a second housing hole.

Meanwhile, the stator 200, the rotor 300, and the sensing unit 400 may be disposed in the accommodation space.

Figure 2:
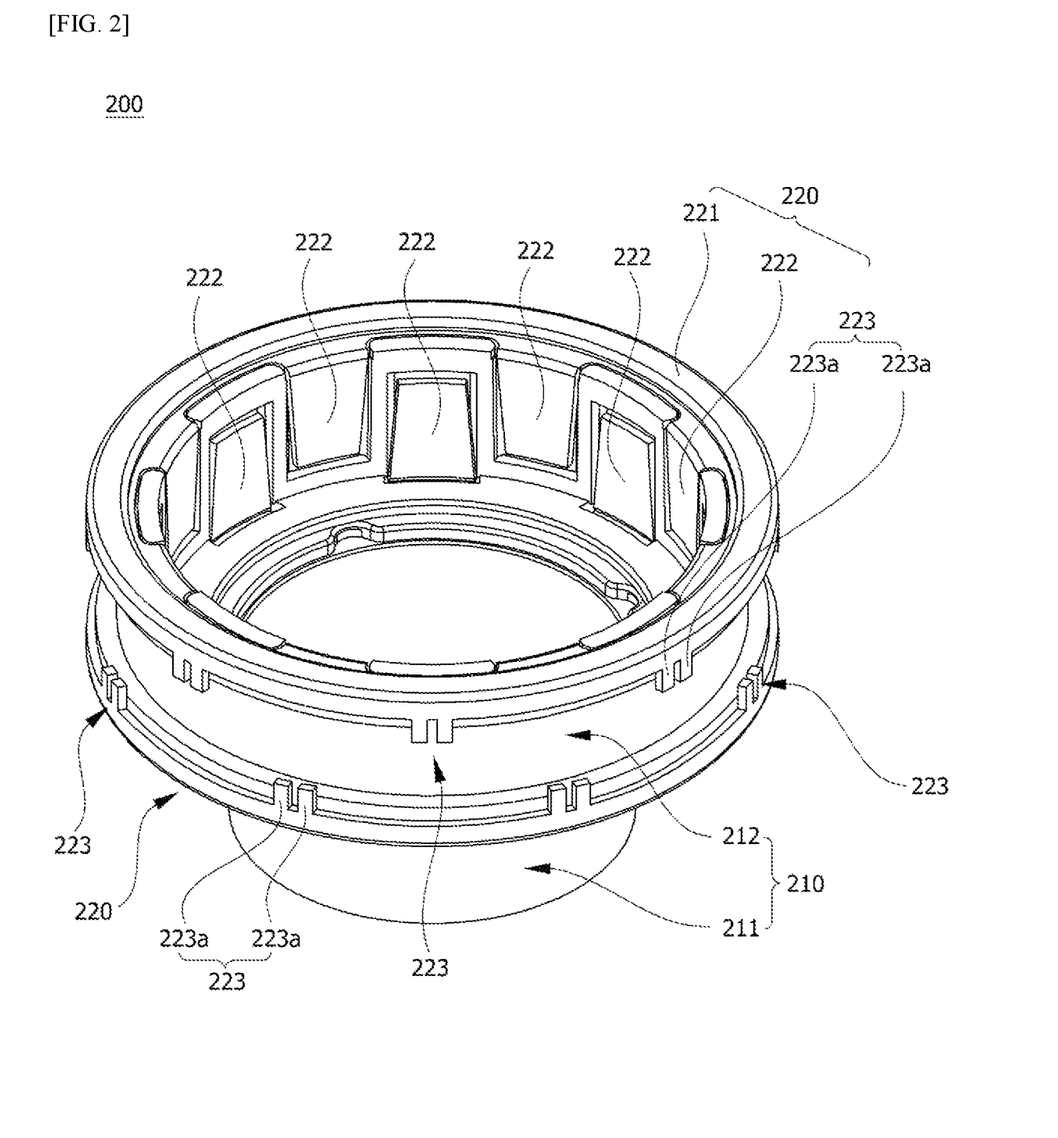
FIG. 2 is a perspective view illustrating a stator according to one embodiment of the present invention.
Figure 3:
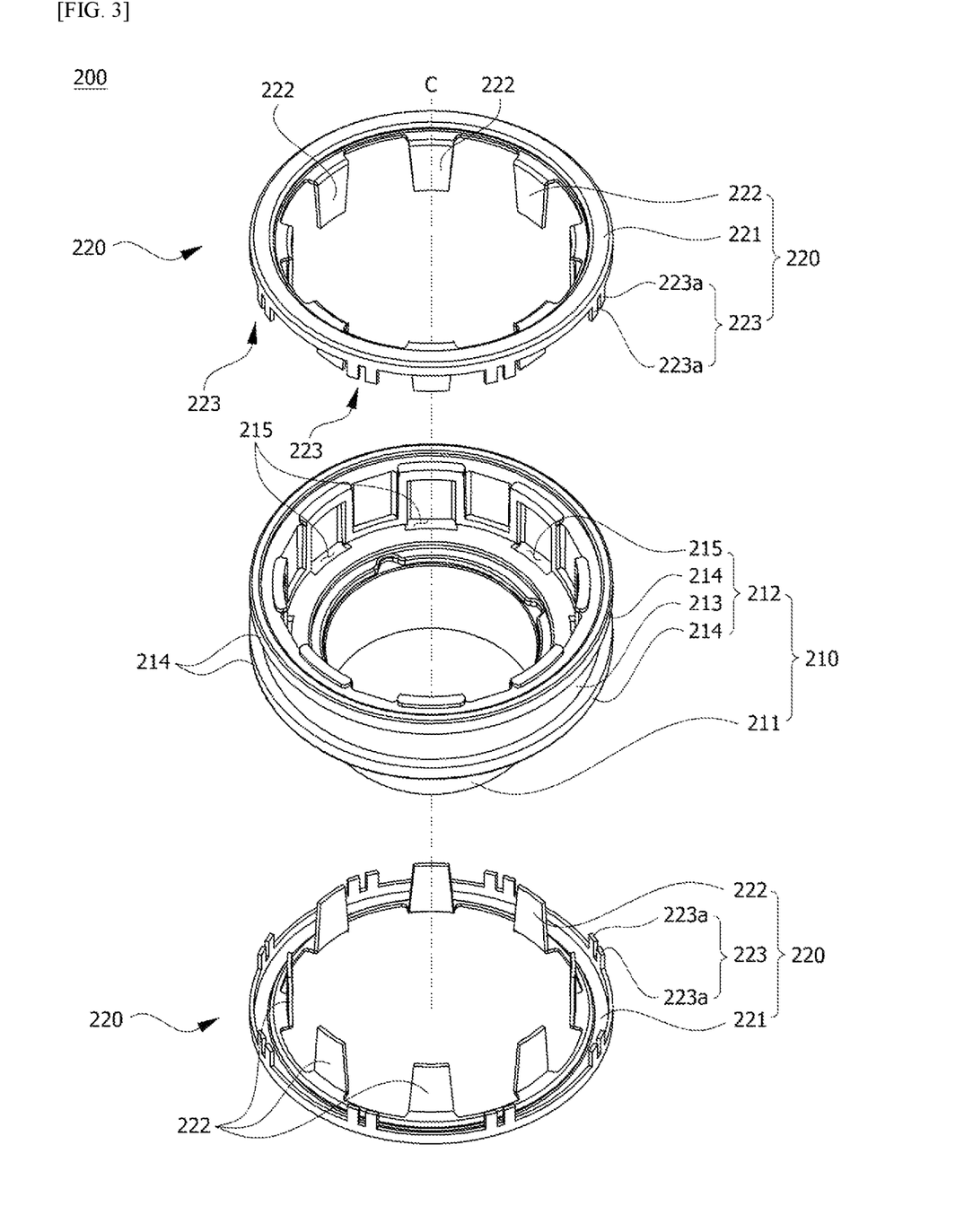
FIG. 3 is an exploded perspective view illustrating the stator according to one embodiment of the present invention.

Referring to FIGS. 2 and 3, the stator 200 according to one embodiment may include a stator holder 210 and stator rings 220 disposed in the stator holder 210.

The stator rings 220 may be fixed and disposed in the stator holder 210.

The stator holder 210 may include a shaft-fixing part 211 and a stator ring-fixing part 212 that have cylindrical shapes. In this case, a pair of stator rings 220 may be disposed in the stator ring-fixing part 212.

The shaft-fixing part 211 may be disposed to be connected to the output shaft of an electronic power steering device. In this case, the shaft-fixing part 211 may be formed of a metal material. However, the present invention is not necessarily limited thereto, and the shaft-fixing part 211 may be formed of a material with a predetermined strength or more so that the output shaft is fixedly inserted into the shaft-fixing part 211.

The stator ring-fixing part 212 may be disposed on one end portion of the shaft-fixing part 211. For example, the stator ring-fixing part 212 may be disposed on one end portion of the shaft-fixing part 211 using an insert-injection molding method that uses a synthetic resin such as a resin.

The stator ring-fixing part 212 may include a fixing part-main body 213, flanges 214, and insertion holes 215 formed in the fixing part-main body 213. In this case, teeth 222 of the stator ring 220 may be inserted into the insertion holes 215. In this case, the insertion hole 215 may be referred to as a hole.

The flanges 214 may be formed to protrude outward (in the radial direction) from the ring-shaped fixing part-main body 213 in a circumferential direction.

The pair of flanges 214 may be disposed to be vertically spaced apart from each other. As shown in FIG. 3, the pair of flanges 214 may be disposed on outer sides of upper and lower end portions of the fixing part-main body 213. In this case, the outer side refers to a side in a direction opposite to a direction facing a center C of the fixing part-main body 213, and an inner side refers to a side in a direction opposite to the outer side.

As shown in FIG. 3, the plurality of insertion holes 215 may be formed in the fixing part-main body 213 in the circumferential direction with respect to the center C at regular intervals.

Further, when the teeth 222 of the stator ring 220 are inserted into the insertion holes 215, the teeth 222 of the stator ring 220 may be disposed on an inner surface of the stator ring-fixing part 212. As shown in FIG. 2, the teeth 222 of the stator ring 220 may be disposed on an inner surface of the fixing part-main body 213.

The stator ring 220 may include a pair of stator rings.

The stator ring 220 may include a ring-shaped body 221, the plurality of teeth 222, and protrusion parts 223, wherein the teeth 222 are disposed to be spaced apart from each other along an inner circumferential surface of the body 221, and the protrusion parts 223 are disposed to be spaced apart from each other along an outer circumferential surface of the body 221. In this case, the teeth 222 and the protrusion parts 223 may be formed to protrude in the same direction. Further, the body 221, the teeth 222, and the protrusion parts 223 may be integrally formed.

The teeth 222 may be formed to protrude from an inner circumferential surface of the body 221 in an axial direction.

As shown in FIG. 3, any one of the pair of stator rings 220 may be disposed on one portion (upper portion) of the stator ring-fixing part 212, and the other one may be disposed on the other portion (lower portion) of the stator ring-fixing part 212. Accordingly, as shown in FIG. 2, the teeth 222 of the stator ring 220 may be alternately disposed to interlock at regular distances.

The protrusion parts 223 may be formed to protrude from the outer circumferential surface of the body 221 in the axial direction.

The protrusion parts 223 may be fixed to an outer surface of the stator ring-fixing part 212 by caulking. Since the protrusion parts 223 are coupled to the outer surface of the stator ring-fixing part 212 using a caulking method that presses one sides of the protrusion parts 223 to bend, an assembly gap is not formed.

Figure 6:
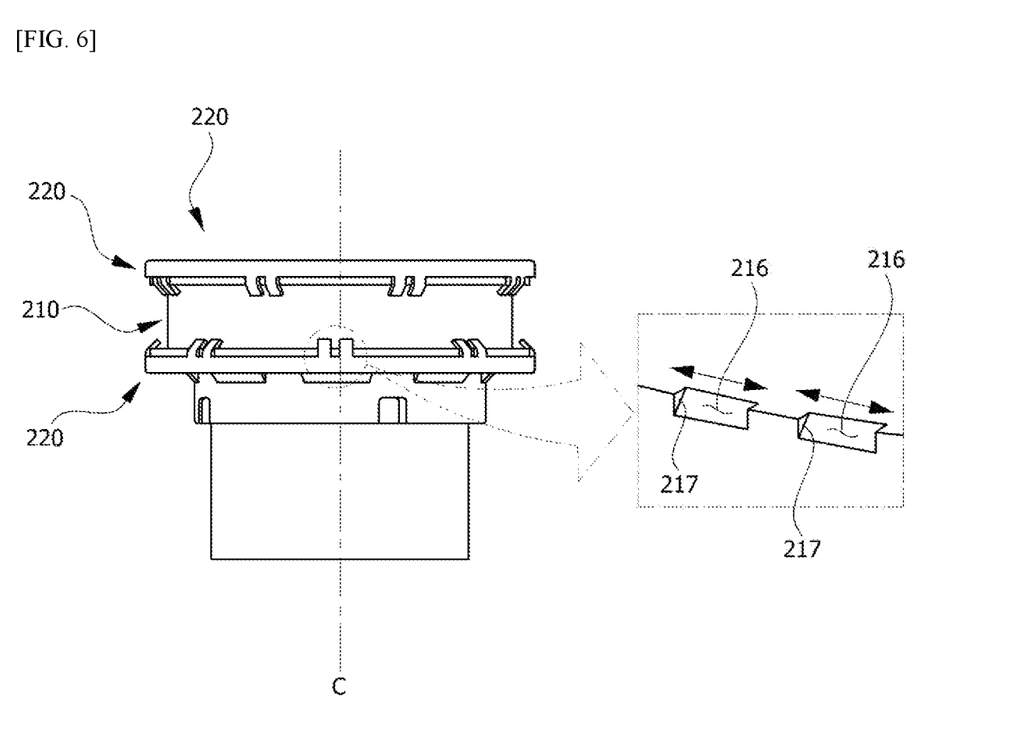
FIG. 6 is a view illustrating grooves formed in a flange of the stator according to one embodiment of the present invention.

As shown in FIG. 6, the protrusion parts 223 may be fixed to the flanges 214 of the stator ring-fixing part 212 by the caulking. Therefore, a coupling force of the protrusion parts 223 to the stator ring-fixing part 212 may be increased.

Meanwhile, the teeth 222 and the protrusion parts 223 may be disposed to be spaced apart from each other in the radial direction.

When viewed in the radial direction (y direction), the protrusion parts 223 may be disposed between the teeth 222.

When the protrusion parts 223 are disposed to overlap the teeth 222 when viewed in the radial direction (y direction), a magnetic field is affected, and thus the protrusion parts 223 are disposed between the teeth 222 so that an influence of the magnetic field can be prevented.

Figure 4:
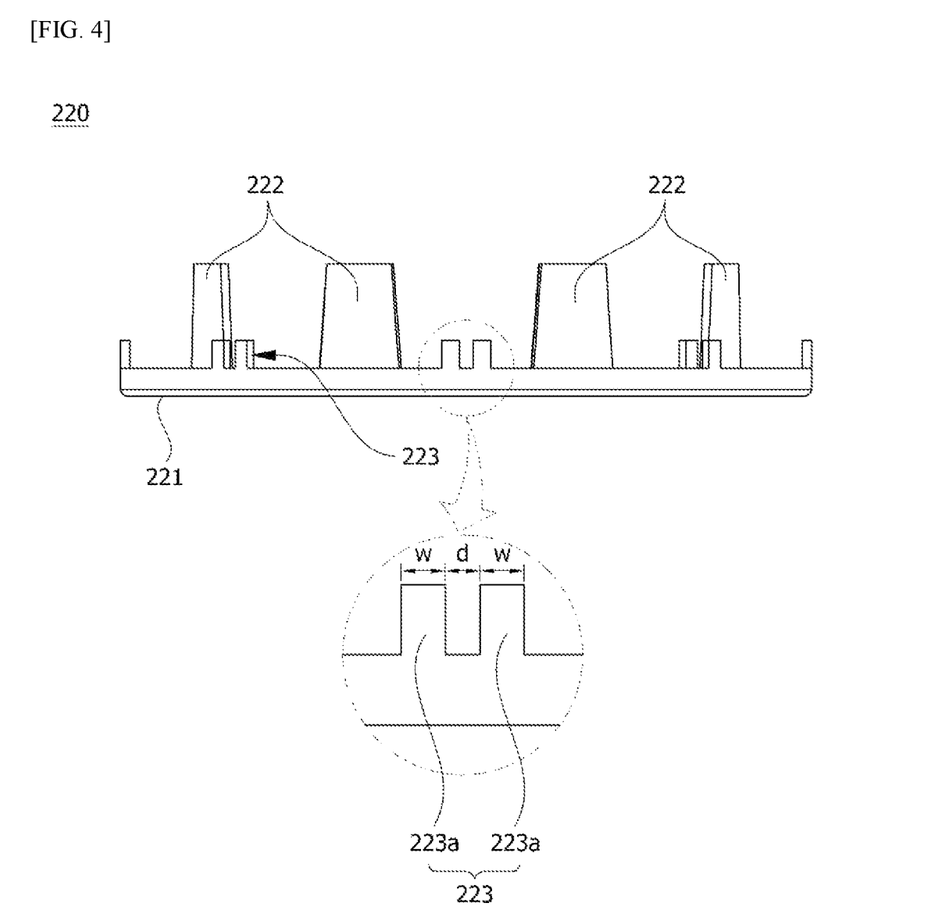
FIG. 4 is a side view of a stator ring of the stator according to one embodiment of the present invention.

The protrusion parts 223 may be provided as two or more first protrusions 223a that are disposed to be spaced apart from each other. As shown in FIGS. 3 and 4, since the protrusion parts 223 have a double caulking structure, a coupling force of the protrusion parts 223 to the stator ring-fixing part 212 can be more increased. Further, in the double caulking structure of the protrusion parts 223, a contact area with the stator ring-fixing part 212 is increased, and thus a caulking force in a rotation direction of the protrusion parts 223 may be increased.

As shown in FIG. 4, the two first protrusions 223a may be disposed to be spaced apart from each other by a predetermined distance d. Further, the first protrusion 223a may be formed in a rectangular shape, and a height of the first protrusion 223a is smaller than that of the tooth 222. In this case, the distance d may be formed using the following formula:

$$d:W=1:1.5.$$

As shown in FIG. 4, a ratio of the distance d to a width W of the first protrusion 223a may be 1:1.5. That is, since the first protrusions 223a are disposed adjacent to each other, the caulking force in the rotation direction of the protrusion parts 223 may be increased. Further, since one region of the stator ring-fixing part 212 is disposed between the first protrusions 223a, a coupling force between the stator holder 210 and the stator ring 220 is increased.

Figure 5:
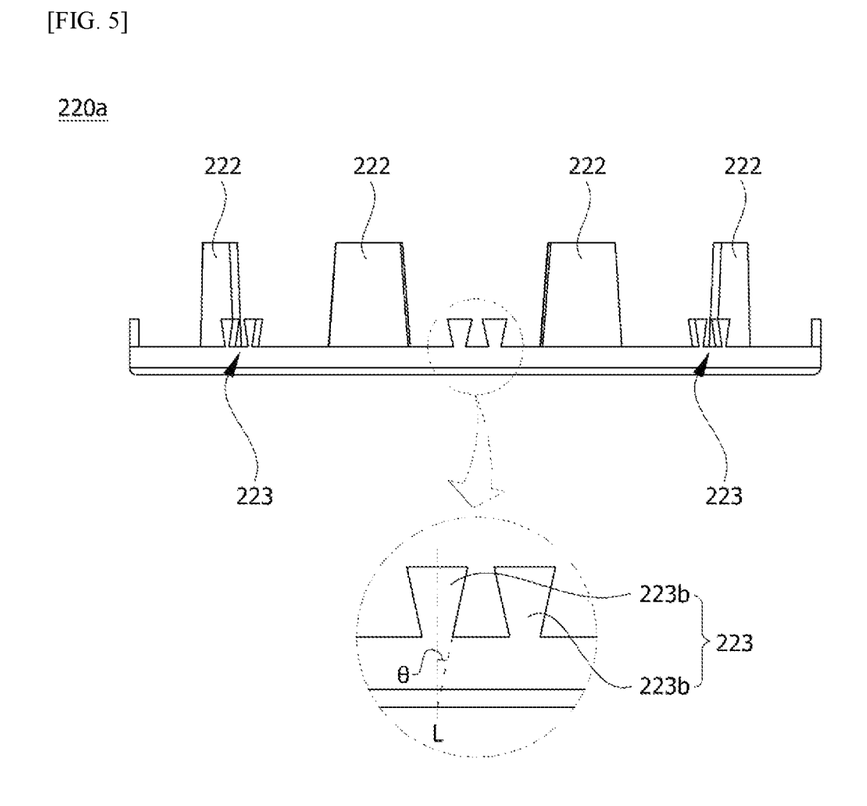
FIG. 5 is a side view illustrating a stator ring disposed in the stator according to another embodiment of the present invention.

FIG. 5 is a side view illustrating a stator ring disposed in the stator according to another embodiment of the present invention. Instead of the above-described stator ring 220, a stator ring 220a according to another embodiment may be disposed in the stator holder 210.

Hereinafter, in the description of the stator ring 220a, the same component as the stator ring 220 is described with the same reference numeral, and detailed descriptions thereof will be omitted.

Referring to FIG. 5, the stator ring 220a according to another embodiment of the present invention may include a body 221, a plurality of teeth 222, and protrusion parts 223 disposed to be spaced apart from each other along an outer circumferential surface of the body 221. In this case, the protrusion parts 223 may be provided as two or more second protrusions 223b disposed to be spaced apart from each other.

The second protrusions 223b may have one surface formed to be inclined at a predetermined angle θ.

As shown in FIG. 5, one surface of the second protrusion 223b may be formed to be inclined from a virtual line L at a predetermined angle θ, wherein the virtual line L passes through a center of the protrusion. Therefore, since contact areas between the stator ring-fixing part 212 and the second protrusions 223b are increased, a caulking force in a rotation direction of the protrusion parts 223 may be increased.

As shown in FIG. 5, a width adjacent to the body 221 of the second protrusion 223b may be small but may increase in a direction away from the body 221. For example, the second protrusion 223b may be formed in a trapezoid shape. However, the present invention is not limited thereto, and the second protrusion 223b may be formed in various shapes in consideration of a contact area with the stator ring-fixing part 212.

Meanwhile, since the protrusion parts 223 are fixed to an outer surface of the stator ring-fixing part 212 by the caulking of the protrusion parts 223, as shown in FIG. 6, grooves 216 may be formed in the flanges 214 of the stator ring-fixing part 212. In this case, the number of the grooves 216 may correspond to the number of the protrusions 223a and 223b. Therefore, the holding-protrusion surfaces 217 formed in the grooves 216 may be disposed to face each other.

Further, the protrusions 223a and 223b are pressed against the holding-protrusion surfaces 217.

Therefore, the holding-protrusion surfaces 217 support lateral sides of the protrusions 223a and 223b to increase the caulking force in a rotation direction. Particularly, since contact areas between the second protrusions 223b and the holding-protrusion surfaces 217 are increased, a supporting force and the caulking force in the rotation direction of the second protrusions 223b can be increased more than that of the first protrusions 223a.

An example of the grooves 216 is formed by caulking the protrusion parts 223 are described, but the present invention is not limited thereto. For example, the grooves 216 are formed in the flange 214, and the protrusions 223a and 223b are inserted into the grooves 216, and thus the stator ring 220 or 220a may be fixed to the stator ring-fixing part 212. In this case, since end portions of the protrusions 223a and 223b are bent, the protrusions 223a and 223b may be disposed in the grooves 216. Therefore, the protrusions 223a and 223b may be supported by the holding-protrusion surfaces 217.

The rotor 300 may be disposed in the stator ring 220 or 220a. The rotor 300 is connected with an input shaft of a steering wheel, wherein the input shaft may refer to a steering shaft connected with the steering wheel of a vehicle. The rotor 300 may include a cylindrical yoke 310 and a magnet 320 disposed on the yoke 310. The input shaft is inserted into the yoke 310. The magnet 320 may be disposed on an outer side of the yoke 310. The magnet 320 may fixedly adhere to an outer circumferential surface of the yoke 310 or be fixedly press-fitted thereto.

The sensing unit 400 measures a magnetic field generated between the stator 200 and the rotor 300. The sensing unit 400 is connected with an electronic control unit (ECU) of a motor that assists steering so as to calculate and transmit torque based on a change in the measured magnetic field.

The sensing unit 400 may include a collector 410 and a substrate 420 including a sensor.

The collector 410 may collect a flux of the stator 200. In this case, the collector 410 may be formed of a metal material and fixed to an inside of the housing 100.

The sensor disposed on the substrate 420 may detect a change in magnetic field. A Hall integrated circuit (Hall IC) may be provided as the sensor. Therefore, the sensor detects a magnetic field of the stator ring 220 or 220a generated by an electrical interaction between the stator ring 220 or 220a and the magnet 320 of the rotor 300. Further, the sensing device 1 may measure torque based on the detected magnetic field.

The embodiments of the present invention have been described above, but it should be understood by those skilled in the art that various changes and modifications may be made therein without departing from the spirit and scope of the present invention defined by the appended claims. Differences related to such changes and modifications are also included in the scope of the invention defined in the appended claims.

DESCRIPTION OF SYMBOLS

1: SENSING DEVICE
100: HOUSING
200: STATOR
210: STATOR HOLDER
211: SHAFT-FIXING PART
212: STATOR RING-FIXING PART
220, 220a: STATOR RING
221: BODY
222: TOOTH
223: PROTRUSION PART
223a, 223b: PROTRUSION
300: ROTOR
400: SENSING UNIT

The invention claimed is:

1. A sensing device comprising:
a rotor; and
a stator disposed on an outside of the rotor,
wherein
the stator includes a stator holder and a stator ring disposed in the stator holder,
the stator ring includes a body, a plurality of teeth formed to protrude from an inner circumferential surface of the body, and a protrusion part formed to protrude from an outer circumferential surface of the body,
when viewed in a radial direction, the protrusion part is disposed between the teeth, and
the protrusion part is provided as a plurality of protrusions, groups of two or more of the protrusions being disposed to be spaced apart from each other such that ones of the protrusions included in one of the groups are positioned closer together than to other ones of the protrusion included in other ones of the groups.

2. The sensing device of claim 1, wherein the stator holder includes a stator ring-fixing part and a shaft-fixing part, and
the protrusions are coupled to an outer surface of the stator ring-fixing part in a caulking manner.

3. The sensing device of claim 2, wherein the stator ring-fixing part is formed of a synthetic resin.

4. The sensing device of claim 1, wherein the stator holder includes a stator ring-fixing part and a shaft-fixing part,
the stator ring-fixing part includes a fixing part-main body and a flange that protrudes from an outer circumferential surface of the fixing part-main body in a radial direction, and
the protrusions are fixed to the flange in a caulking manner.

5. The sensing device of claim 4, wherein grooves are formed in the flange by the caulking, and
the protrusions are supported by holding-protrusion surfaces formed in the grooves.

6. The sensing device of claim 1, wherein a ratio of a distance (d) between the protrusions to a width (W) of the protrusion is 1:1.5.

7. The sensing device of claim 1, wherein one surface of the protrusion is formed to be inclined from a virtual line (L), which passes through a center of the protrusion, at a predetermined angle (θ).

8. The sensing device of claim 1, wherein the body, the teeth, and the protrusions are integrally formed, and
the teeth and the protrusions protrude in the same direction.

9. The sensing device of claim 8, wherein a height of the protrusion is smaller than that of the tooth.

10. The sensing device of claim 1, further comprising a sensing unit configured to measure a magnetic field generated between the rotor and a stator assembly.

11. The sensing device of claim 1, wherein each of the groups of the protrusions is provided between a corresponding adjacent pair of the teeth.

12. A sensing device comprising:
a rotor; and
a stator disposed on an outside of the rotor,
wherein:
the stator includes a stator holder and a stator ring disposed in the stator holder,
the stator ring includes a body, a plurality of teeth formed to protrude from an inner circumferential surface of the body, and a protrusion part formed to protrude from an outer circumferential surface of the body,
when viewed in a radial direction, the protrusion part is disposed between the teeth
the protrusion part is provided as two or more protrusions disposed to be spaced apart from each other,
the stator holder includes a stator ring-fixing part and a shaft-fixing part,
the stator ring-fixing part includes a fixing part-main body and a flange that protrudes from an outer circumferential surface of the fixing part-main body in a radial direction, and
the protrusions are bent and disposed in grooves of the flange.

13. A sensing device comprising:
a rotor; and
a stator disposed on an outside of the rotor,
wherein:
the stator includes a stator holder and a stator ring disposed in the stator holder,
the stator ring includes a body, a plurality of teeth formed to protrude from an inner circumferential surface of the body, and a protrusion part formed to protrude from an outer circumferential surface of the body,
when viewed in a radial direction, the protrusion part is disposed between the teeth,
the protrusion part is provided as two or more protrusions disposed to be spaced apart from each other, and
a width of the protrusion increases in a direction away from the body.

14. The sensing device of claim 13, wherein the protrusion is formed in a trapezoid form.

* * * * *